United States Patent [19]
Popeil

[11] 3,976,413
[45] Aug. 24, 1976

[54] ADJUSTABLE FISH BAIT FORMING DEVICE

[75] Inventor: Samuel Joseph Popeil, Chicago, Ill.

[73] Assignee: Popeil Brothers, Inc., Chicago, Ill.

[22] Filed: Jan. 9, 1975

[21] Appl. No.: 539,929

Related U.S. Application Data
[63] Continuation-in-part of Ser. No. 487,853, July 12, 1974, abandoned.

[52] U.S. Cl. .............................. 425/117; 425/286; 425/298; 43/4
[51] Int. Cl.² ........................................ A01K 97/00
[58] Field of Search ........... 425/110, 117, 286, 298, 425/299

[56] References Cited
UNITED STATES PATENTS

| | | | |
|---|---|---|---|
| 506,791 | 10/1893 | Nebeker | 425/298 X |
| 693,360 | 2/1922 | Bahl | 425/286 |
| 874,277 | 12/1907 | Adams et al. | 425/286 X |
| 1,868,656 | 7/1932 | Brezin | 425/286 |
| 1,896,083 | 7/1933 | Harris | 425/286 |
| 1,978,942 | 10/1934 | Harris | 425/286 |
| 2,846,803 | 8/1958 | Rettig | 43/4 |

FOREIGN PATENTS OR APPLICATIONS

| | | | |
|---|---|---|---|
| 4,383 | 8/1878 | Germany | 425/298 |
| 2,165 | 1/1897 | United Kingdom | 425/298 |

Primary Examiner—Francis S. Husar
Assistant Examiner—David S. Safran
Attorney, Agent, or Firm—Dominik, Knechtel, Godula & Demeur

[57] ABSTRACT

An adjustable fish bait forming device is disclosed having a body, a pusher, a tip, an adjusting screw, an adjustment knob, the same being assembled in sequential order of tip and body, pusher within the body, an adjustment knob being at the end of the body remote from the tip. A piston is provided to reciprocate within a cylinder defined at the tip, beginning at a predetermined position within the cylinder so that a bait may be formed of infinitely variable length within the confines of the structure by pressing the tip into the bait, removing the same, and then actuating the pusher to remove the bait. As disclosed the threaded means for determining the position of the piston at the beginning of the formation of the dough is a left-hand thread in order to provide for clockwise adjustment to decrease the size of the bait. Also, at the top of the pusher, an index point is provided which operates in conjunction with graduations to predetermine the length of the bait.

18 Claims, 9 Drawing Figures

U.S. Patent   Aug. 24, 1976   Sheet 1 of 2   3,976,413
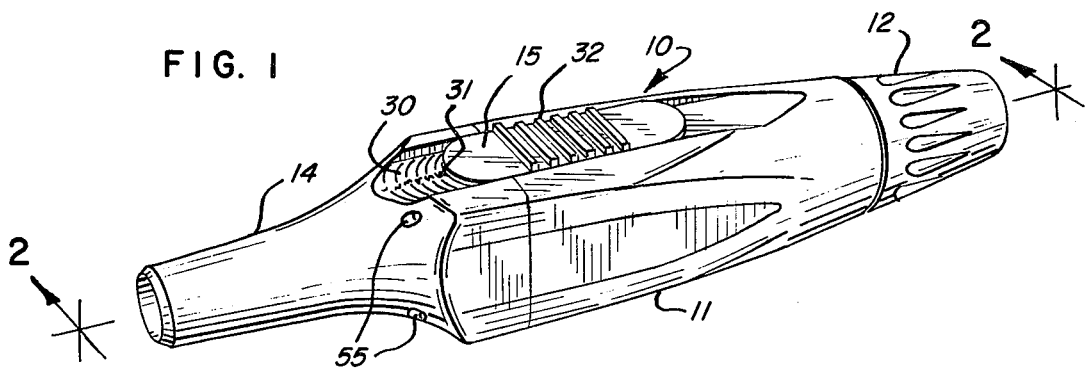
FIG. 1
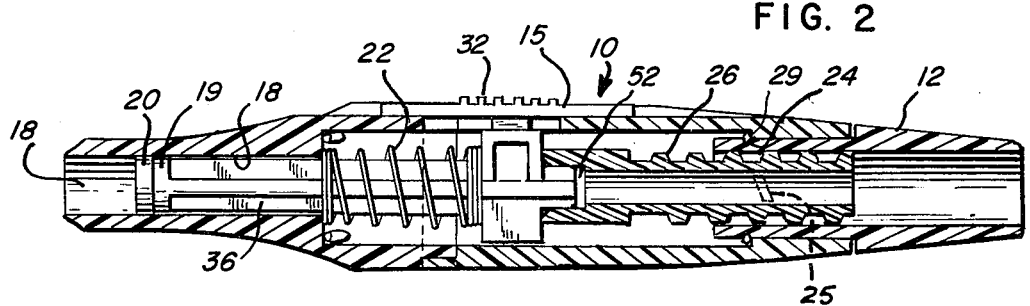
FIG. 2
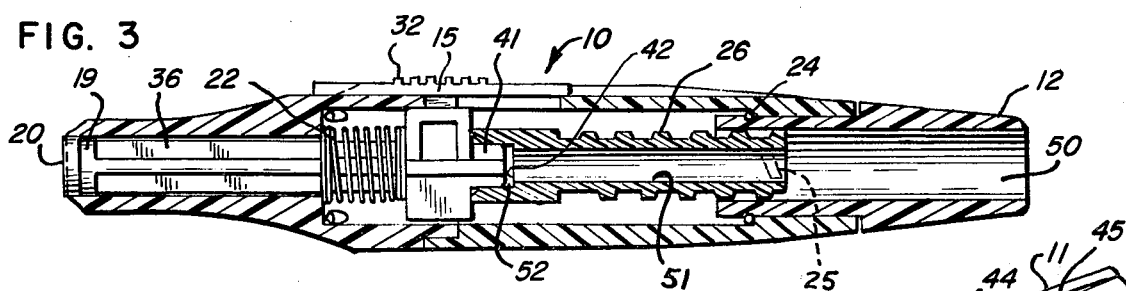
FIG. 3
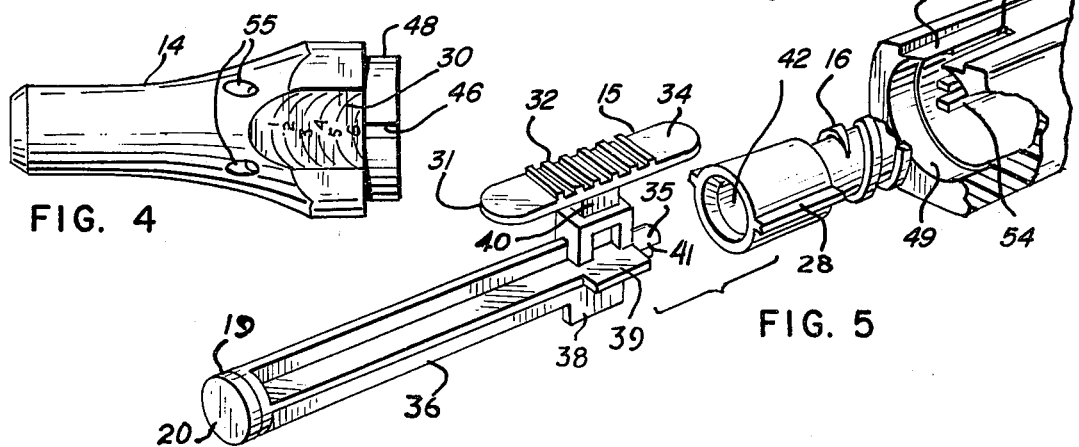
FIG. 4
FIG. 5

ADJUSTABLE FISH BAIT FORMING DEVICE

BACKGROUND

1. Related Cases

The present patent application forms a continuation-in-part of previously filed U.S. patent application 487,853 filed July 12, 1974, in the name of Samuel J. Popeil and entitled Fish Bait Forming Device, and now abandoned.

2. Field of the Invention

The present invention deals with devices for forming bait of a dough-like material. While a mixture of fish food and fish eggs is a highly desirable medium, the same can also be employed with various doughs, cheeses, and other attractive baits. The device accommodates itself to the formation of the bait around a hook which can be implanted within the cylindrical chamber.

3. Prior Art

Generally, fish bait dough has been known for years and the use of the same on a fish hook is also well known. Forming the same without contact with the hands and around the fish hook is, however, less known. It is to this function that the present bait gun is directed.

SUMMARY

The present invention is directed to an adjustable fish bait forming device which has a body and a tip. A cylindrical recess is defined within the tip, and terminates at its interior extremity with a piston which is slidably mounted within the tip. A pusher is provided for actuating the piston toward the end of the tip, coordinated with adjustable positioning means which predetermine the hollow cylindrical reservoir prior to pressing the tip into a bait dough for forming the bait. The diameter of a cylinder is proportioned to receive a hook prior to pressing the same into the bait, whereby the bait can be molded on the hook in a single motion. In addition, hollow means are provided at one end of the device so that it can be flushed to clean it.

In view of the foregoing, it is a primary object of the present invention to provide a fish bait forming device which will form a proportioned size of cylindrical pre-molded bait which is adjustable as to length.

Still another object of the present invention is to provide an adjustable bait forming device which is proportioned for infinite adjustment within its length of travel of the length of the cylindrical bait form. A related object looks to the provision of graduations on the bait device so that repeatability of various size slugs of bait can be achieved.

Still another object of the present invention is to provide an adjustable bait forming device with a spring loaded return of the ejection means whereby it can be promptly positioned for reactivation by its own means.

Still another important object of the present invention is to provide an adjustable bait forming device in which there are no loose parts, and which also permits the formation of the bait around the fish hook.

The subject fish bait forming device may be desirably constructed in a configuration readily held by the hand, and easily stored in a person's pocket, or fish tackle box.

Still another object of the present invention is to provide an adjustable bait forming device which is inherently susceptible of molding from non-corrosive plastic parts, with a minimum of metal parts being required. This accomplishes the two-fold advantage of inhibiting corrosion, and maintaining the inherent manufacturing and assembly cost of the fish bait forming device at a low level.

Still another object of the present invention resides in the ability to adjust the position of the piston within the tip out to the far end, so that the end of the piston may be readily flushed with water, while the interior portions may be also cleansed.

THE DRAWINGS

Further objects and advantages will become apparent as the following description of an illustrative embodiment proceeds, taken in conjunction with the accompanying drawings in which:

FIG. 1 is a perspective view of the subject adjustable fish bait forming device.

FIG. 2 is a longitudinal sectional view of the subject bait forming device taken along sections lines 2—2 of FIG. 1, in essentially the same perspective as FIG. 1.

FIG. 3 is a view identical to FIG. 2, but showing the position of the piston at the far end of the tip.

FIG. 4 is a top view of the tip disassembled from the balance of the bait forming device.

FIG. 5 is a disassembled partially perspective exploded and broken view illustrating the components of the adjustable bait forming device.

DESCRIPTION OF A PREFERRED EMBODIMENT

Figure 6:
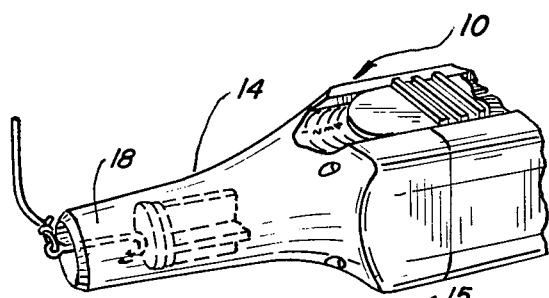
FIG. 6 is a broken enlarged perspective view of the tip portion of the adjustable fish bait forming device illustrating in phantom lines the positioning of a fish hook interiorly of the tip forming a bait around the hook.

The preferred embodiment of the subject adjustable fish bait forming device 10, as shown in FIG. 1, has a central body portion 11, terminating at one end with an adjustment knob 12, and at the remote end with a tip 14. A pusher member 15 is provided with a thumb tread 32 and pusher flat 34 appearing at the upper portion of the body 11. Graduations 30 are provided on the tip for coordinated operation with the pusher index 31, the same being positionable by rotating the adjustment knob 12.

Figure 8:
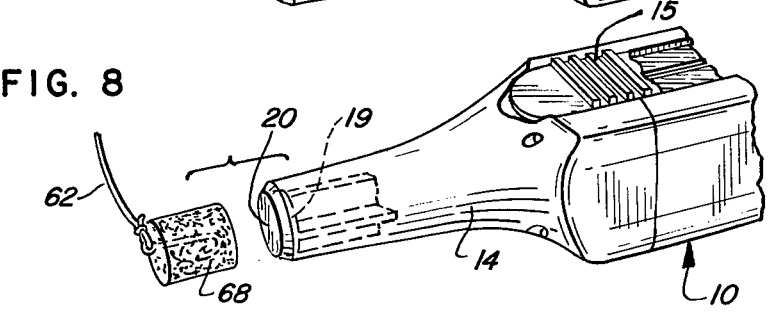
FIG. 8 is an enlarged perspective broken view of the adjustable fish bait forming device illustrating how the bait is removed by advancing the piston forwardly and disclosing the bait slug molded around the hook.
Figure 7:
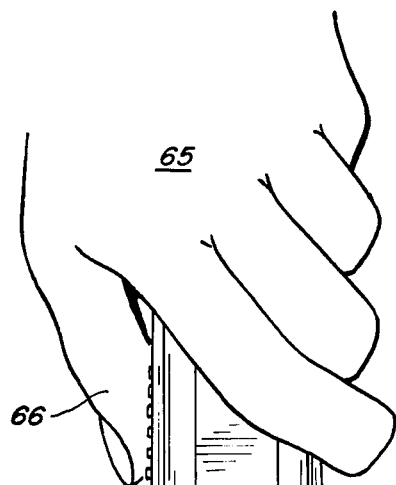
FIG. 7 is a sequential partially diagrammatic view of the adjustable fish bait device showing the step succeeding that in FIG. 6 of forming the bait dough around the hook.
Figure 9:
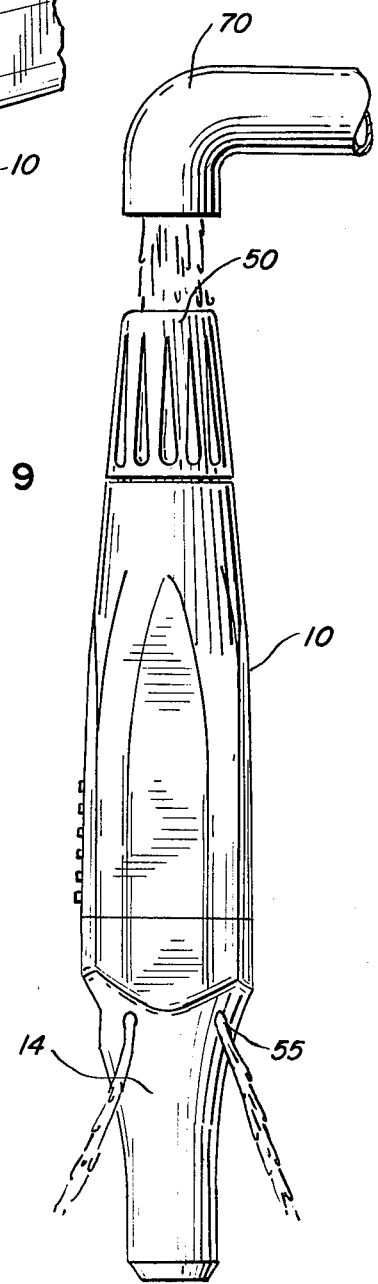
FIG. 9 is a front elevation of the adjustable fish bait forming device illustrating the action whereby it may be cleansed by running water, in this instance illustrated for flushing by tap water.

The detailed construction will be more fully appreciated after the use of the unit is understood. Referring now to FIG. 6, it will be seen that the adjustable fish bait forming device 10 may, by rotating the adjustment knob 12, be positioned to define an interior portion at the front of the tip 14 which can receive a fish hook 61 along with its attached fishing line 62. Thereafter, as shown in FIG. 7, the user grasps the body 11 of the bait forming device 10 and then presses the same into a bait paste or dough 60. This action is continued by pressing downwardly with the hand 65 and thumb 66 until a slug of bait is formed around the fish hook 61. Thereafter, as shown diagrammatically in FIG. 8, the thumb 66 of the operator is pressed forwardly, thereby advancing the piston 19 and its piston head 20 forwardly within the bait cylinder 18 until the baited hook 68 is ejected from the cylinder 18. Thereafter, the baited hook 68 is controlled by the line 62. It will be observed that in the steps just recited, there is no requirement that the baited hook 68 be touched by the hand, thereby minimizing the possibility of foreign odors or flavors attaching to the baited hook 68. Also, to be noted in FIG. 9 is the means whereby the adjustable bait forming device 10 may be flushed, shown here as by running tap water through the flushing bore 50 of the adjustment knob 12, until the same ejects from the flush drains 55 of the tip 14.

While the same is shown as being accomplished under a water tap 70, it should be understood that by reciprocating the bait forming device 10 underneath the surface of the water where fishing is taking place, the same flushing action can be stimulated, thereby cleaning the bait device 10.

Turning now to FIG. 2, it will be seen that a pusher spring 22 is provided interiorly of the unit to coaxially surround the connecting shaft 36 which is between the piston 19 and the balance of the pusher 15. The pusher spring 22 biases the piston 19 into the retracted position within the bait cylinder 18. Also to be noted is the positioning of the adjustment knob 12 within the rear portion of the body 11, and retained in place by means of the retaining ring 24. The retaining ring 24 rides against a shoulder 29 within the body 11, and prevents the same from being removed.

An interior female lug 25 is formed in the adjustment knob 12. The female lug 25 is threadily engaged with the adjusting screw thread 26 so that rotation of the knob 12 in clockwise position (viewing the unit the rear) will advance the piston 19. The adjusting screw fins 28 (see FIG. 4) are proportioned to slide within fin guides 54 in the body 11 to secure the adjusting screw thread against rotation as well as the adjusting screw itself.

As described above, the graduations 30 as shown in FIG. 1 then appear to the user as they are uncovered by and the pusher index 31 of the pusher 15 when the knob 12 is rotated in a counterclockwise direction until the maximum length of the bait cylinder 18 is prepositioned. Alternatively, when a small slug of bait 68 is to be formed, the knob 12 is rotated in a clockwise direction and the piston 19 advanced. Here it should be pointed out that the piston 19 may be of one material, assuming that the same will not adhere too firmly to the bait slug 68, or alternatively, a piston head 20 of a release type material may be secured to the end of the piston 19.

The thumb tread 32 is a raised element on the pusher 15, and is positioned above a pusher flat 34 which, in turn, rides atop the pusher flat channel 44 in the body 11. Beneath the pusher flat 34 is a junction post 35. The upper portion of the junction post 35 has a neck 40 which rides within the neck slot 45 of the body 11, and its forward motion terminates in the neck notch 46 of the tip 14 (see FIG. 4). The tip 14 is joined to the body 11 by means of a ring joint 48 formed on the tip 14, which in turn seats within the ring seat 49 of the body 11 (see FIG. 4). Also shown in FIG. 4 is the pusher stud 41, here shown in a fluted configuration, which is nestingly received by the pusher stud cup 42 in the adjustment screw 16. The fluted construction permits a bypass of flushing water which passes down through the flush bore 50 of the knob 12, through the flush bore 51 of the pusher 15, and then through the bypass area 52 (see FIG. 3) at the forward portion of the adjustment screw 16.

To be observed is the susceptibility of molding of the principal elements of the bait forming device 10, namely; the body 11, adjustment knob 12, tip 14, pusher 15, and adjustment screw 16. The only desirably metallic parts are the pusher spring 22, and the retaining ring 24 which are both susceptible of flushing in the cleaning operation, particularly the pusher spring 22. Furthermore, should corrosion develop around the retaining ring 24, the action is relatively harmless since it will serve only to further secure the knob 12 from dislodgement.

In review, it will be seen that the subject fish bait forming device is easily formed, adjustable within its designed length, and easy to use. It is also provided with convenient means for flushing and cleaning whether by the use of tap water, or the water in which the fishing is being done.

It will, therefore, be appreciated that the present invention has provided an improved adjustable fish bait forming device which permits ease of adjustment with respect to the size of the fish bait slug formed about a fish hook. In addition, the device may be easily utilized by the operator without at the same time contaminating the fish bait with any human or other foreign odors repugnant to fish thereby enhancing the fish catching abilities of the bait.

While there has been described what is at present considered to be the preferred embodiments of the invention, it will be understood that various modifications may be made therein, and it is intended to cover in the appended claims all such modifications as fall within the true spirit and scope of the invention.

What is claimed is:
1. An adjustable fish bait forming device comprising, in combination,
    a body having a tip,
    means defining a cylinder in the tip,
    a piston slidably mounted in the tip,
    pusher means associated with said piston for actuating the piston toward the end of the tip,
    adjustment means for positioning the pusher at variable starting points within the tip,
    said adjustment means including a rotatable adjustment knob rotatably mounted to the body at the end opposite the tip,
    and further including means threadedly interconnected with said adjustment knob and disposed axially between said knob and said piston for adjusting the position of the piston,
whereby the length of a cylindrical slug of bait may be predetermined by said adjustment means, the tip inserted into a bait dough, and the same ejected by the pusher means.
2. In the bait forming device of claim 1,
    said pusher having an upraised thumb tread portion for engagement by the thumb of the user while the body is grasped with the rest of the same hand,
    thereby permitting single hand usage by the left and right hand.
3. In the bait forming device of claim 1,
    yieldable means urging the piston to retract within the cylinder, thereby positioning the piston and cylinder automatically for the bait slug forming function.

4. In the bait forming device of claim 1,
said piston and pusher being a single element,
an adjustment screw intermediate the piston and knob,
and a mating female lug carried on said knob and contacting said adjustment screw,
whereby rotating the knob causes threaded contact thereby to advance the pusher and piston.

5. In the bait forming device of claim 4,
said knob and pusher being hollow in the center to define a flush bore,
flush bypass means between the adjustment screw and pusher,
and flush drains in the body,
whereby water may be flushed through the interior of the bait forming device for cleaning.

6. In the bait forming device of claim 1,
flush bore means within the body in open communication with the end opposite the tip,
and flush drains in the body,
whereby water may be flushed through the interior of the bait forming device for cleaning.

7. In the bait forming device of claim 1,
flush bore means within the body in open communication with the end opposite the tip,
and flush drains in the body,
whereby water may be flushed through the interior of the bait forming device for cleaning.

8. An adjustable bait forming device comprising, in combination,
a body,
a pusher,
a tip,
an adjusting screw,
an adjustment knob,
said recited elements being assembled in sequential order of tip and body, said pusher being within the tip and body, said adjustment knob being at the end of the body remote from the tip, and the adjusting screw being axially disposed between and interconnecting the pusher and knob,
said adjusting screw and adjustment knob having interconnected threaded means for advancing one with relation to the other,
said tip having an internal bait forming cylinder,
said pusher having a piston proportioned for sliding engagement with said cylinder,
said interconnected threaded means advancing the piston position within the cylinder responsive to rotation of the knob,
and yieldable means biasing the pusher and tip,
whereby the size of a slug of bait may be predetermined by adjusting the open portion of the cylinder formed therein, and removed by actuation of the pusher.

9. In the bait forming device of claim 8,
said pusher having an upraised thumb tread portion for engagement by the thumb of the user while the body is grasped with the rest of the same hand thereby permitting single hand usage by the left or right hand.

10. In the bait forming device of claim 8,
said knob and pusher being hollow in the center to define a flush bore,
flush bypass means between the adjustment screw and pusher,
and flush drains in the body,
whereby water may be flushed through the interior of the bait forming device for cleaning.

11. In the bait forming device of claim 8,
said pusher having a forwardly extending pusher index,
graduations on the body adjacent the pusher index,
whereby the graduations permit presetting the bait forming device for various bait slug sizes.

12. In the bait forming device of claim 8,
said threaded means being left handed,
whereby clockwise rotation of the adjustment knob decreases the size of the bait slug to be formed.

13. In the bait forming device of claim 9,
all elements being formed and proportioned to position the end of the piston at the end of the tip at maximum adjustment of the piston in one direction by said adjustment knob,
whereby the face of the piston is exposed for cleaning.

14. In the bait forming device of claim 1,
all elements being formed and proportioned to position the end of the piston at the end of the tip at maximum adjustment of the piston in one direction by said adjustment means,
whereby the face of the piston is exposed for cleaning.

15. In the bait forming device of claim 5,
all elements being formed and proportioned to position the end of the piston at the end of the tip at maximum adjustment of the piston in one direction by said adjustment means,
whereby the face of the piston is exposed for cleaning.

16. In the bait forming device of claim 1,
said threaded means being left handed,
whereby clockwise rotation of the adjustment knob decreases the size of the bait slug to be formed.

17. In the bait forming device of claim 4,
said threaded means being left handed,
whereby clockwise rotation of the adjustment knob decreases the size of the bait slug to be formed.

18. In the bait forming device of claim 5,
said threaded means being left handed,
whereby clockwise rotation of the adjustment knob decreases the size of the bait slug to be formed.

* * * * *

UNITED STATES PATENT OFFICE
CERTIFICATE OF CORRECTION

PATENT NO. : 3,976,413
DATED : August 24, 1976
INVENTOR(S) : Samuel Joseph Popeil It is certified that error appears in the above-identified patent and that said Letters Patent are hereby corrected as shown below:

In Claim 13, Line 1, following the word "claim" delete the numeral "9" and substitute the numeral --8--

Signed and Sealed this

Twenty-eighth Day of December 1976

[SEAL]

Attest:

RUTH C. MASON
Attesting Officer

C. MARSHALL DANN
Commissioner of Patents and Trademarks